Figure 2:
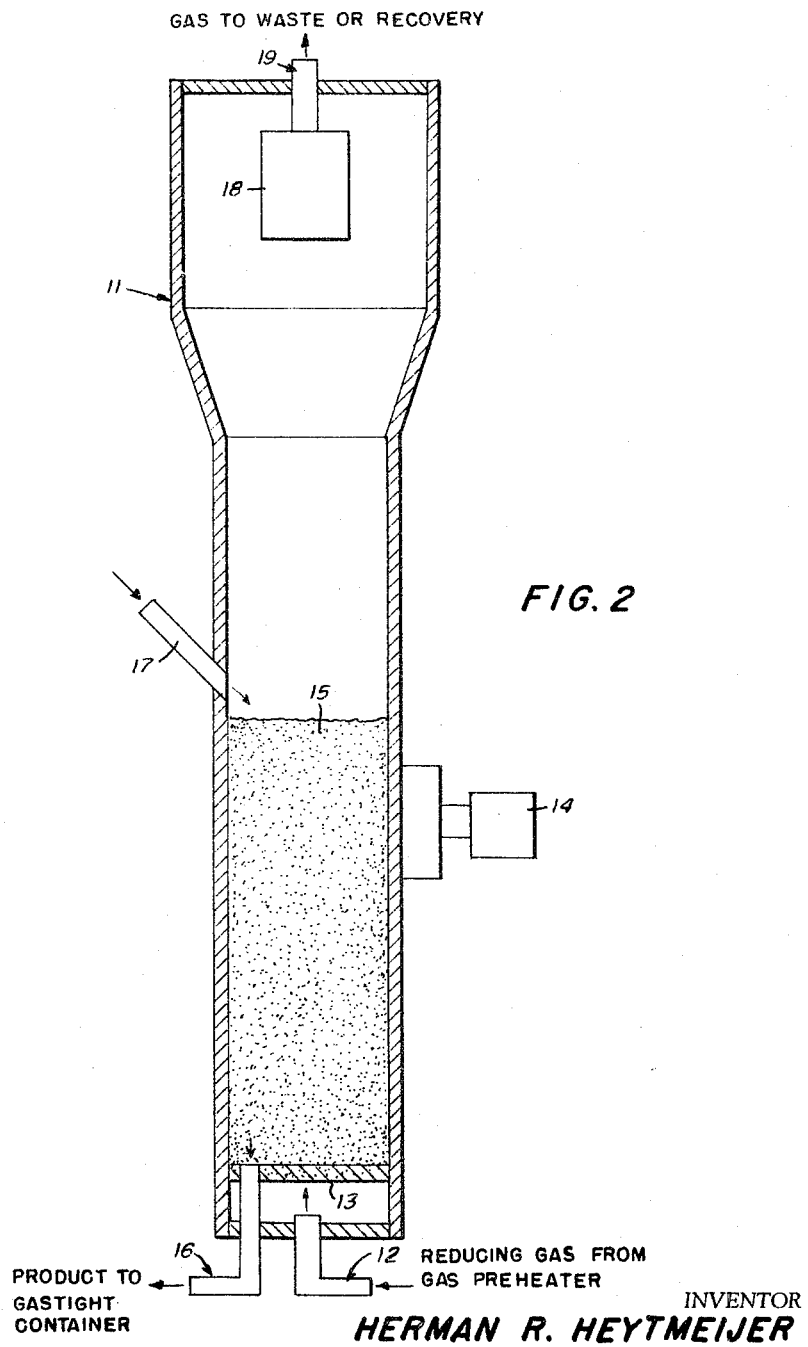

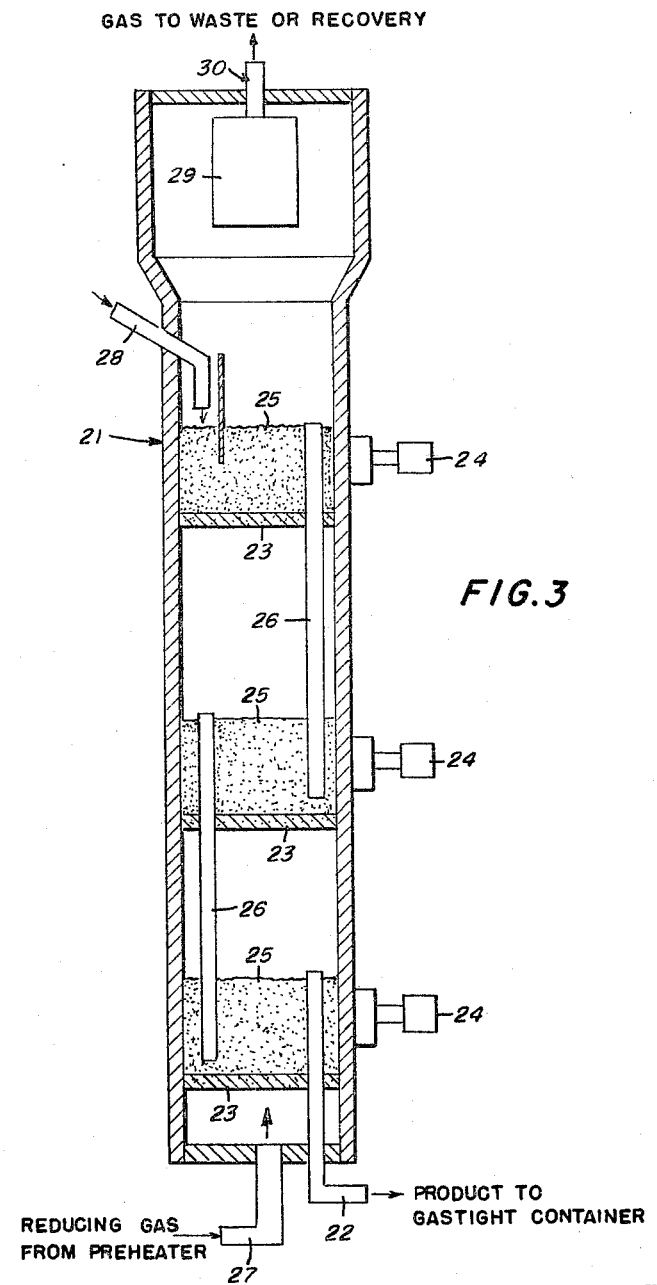

Aug. 2, 1966         H. R. HEYTMEIJER         3,264,098
FLUIDIZED BED PROCESS FOR THE PRODUCTION OF MOLYBDENUM
Filed Aug. 19, 1963                    3 Sheets-Sheet 1

INVENTOR
HERMAN R. HEYTMEIJER

BY *W. D. Palmer*
ATTORNEY 3,264,098
FLUIDIZED BED PROCESS FOR THE PRO-
DUCTION OF MOLYBDENUM
Herman R. Heytmeijer, Belleville, N.J., assignor to West-
inghouse Electric Corporation, East Pittsburgh, Pa., a
corporation of Pennsylvania
Filed Aug. 19, 1963, Ser. No. 302,940
8 Claims. (Cl. 75—84)

The invention relates to the production of free flowing molybdenum metal by a fluidized bed process. More particularly, this invention relates to the production in commercial yields of very pure free flowing molybdenum metal from ammonium paramolybdate or molybdenum oxide in a fluidized bed suspension, using a reducing gas as the suspending and reducing material.

It is known that the $H_2$ reduction of $MoO_3$ starts at approximately 300° C. with the formation of lower oxides. Molybdenum dioxide forms between 300 and 470° C. At temperatures above 440° C. there is a chance that some Mo metal forms. $MoO_3$ volatilizes when heated in air above 600° C. To prevent material losses during the reduction of $MoO_3$ to Mo it is customary, therefore, to carry out the reduction in two stages, the first stage being the conversion of $MoO_3$ to the less volatile lower oxides. Another reason for the two-stage reduction is to prevent the formation of coarse metal powder due to the presence of water vapor developed during the reaction.

Using known methods of reducing molybdenum compounds in a "boat" placed in a furnace it has been found that the reactions cannot be precisely controlled. For example, when high $H_2$ flow rates are used, the material will undergo an exothermal reaction and reach temperatures far in excess of the furnace temperature. The oxide may convert to the molten state (at approximately 790° C.) and when reduced yield so-called "Coni" metal.

In the prior art two-stage process it is necessary to remove the oxide from the furnace after the first stage and crush the material before continuing with the second stage. The product from the second stage is also crushed, screened and tumbled.

The present invention overcomes the foregoing disadvantages of the prior art.

An object of the present invention is to provide a process for the production of very pure free flowing molybdenum metal from ammonium paramolybdate or molybdenum oxide in a one-step operation.

Another object is to produce very pure free flowing molybdenum metal in an economical and commercially practical manner.

It is among the objects of this invention to overcome the disadvantages of the prior methods and to provide an improved method for the production of free flowing elemental molybdenum metal from the reaction of a refractory metal oxide with hydrogen under closely controlled conditions.

The problem solved by the present invention is the one-step reduction of ammonium paramolybdate or molybdenum oxide to a pure elemental metal. The process is a one-step operation, inexpensive in comparison with other processes and it can be a continuous operation.

In a specific and preferred embodiment of the invention, pure, elemental molybdenum is produced by reacting hydrogen with molybdenum oxide in a fluidized bed suspension.

The molybdenum oxide can be obtained from molybdenum containing ore by the processes disclosed in U.S. Patent Nos. 1,501,414 and 1,514,972 and the ammonium paramolybdate from molybdenum containing ore such as molybdenite by the process described by Reluca Pipan and A. Duca (Univ. of Bucharest), "The Preparation of Pure Ammonium Molybdate, $(NH_4)_6Mo_7O_{24}nH_2O$, From Domestic Molybdenite," Acad. Rep. Populare Romane, Bul. Stiint Ser. Mat. Fig. Chem., vol. 2, pp. 381–6 (1950).

$MoO_3$ is a white crystalline powder, sometimes with a blue or green tinge caused by slight reduction by atmospheric dust. Two hydrates exist, the white $MoO_3 \cdot H_2O$ and the yellow $MoO_3 \cdot 2H_2O$. The anhydrous $MoO_3$ volatilizes when heated in air above 600° C.

When molybdenum trioxide $(MoO_3)$ is reduced at elevated temperature in hydrogen according to the equation $MoO_3 + 3H_2 = Mo + 3H_2O$, the oxide undergoes a loss in weight due to the loss of oxygen. Similarly, when molybdenum dioxide is reduced to metal $$(MoO_2 + 2H_2 = Mo + 2H_2O)$$

a loss in weight takes place. In this case, the percentage weight loss is, of course, less than for $MoO_3$ because less oxygen has to be removed. Pure Mo metal shows no loss in weight when heated in $H_2$. To determine the oxygen content of a molybdenum oxide a sample is reduced to the metal in hydrogen and its loss in weight measured. To achieve the metallic state, if the sample were pure, the loss in weight for $MoO_3$ would be approximately 33.3% and approximately 25% for $MoO_2$. The less the loss in weight the closer the composition of the sample is to pure metal.

Figure 1:
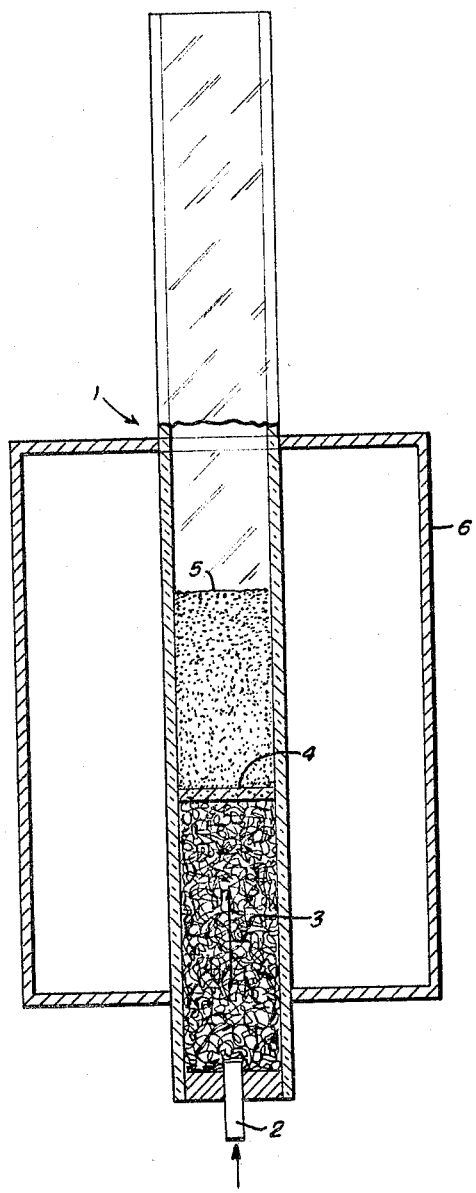

Referring to the drawings, FIG. 1 shows a batch or single stage reducer, FIG. 2 shows an improved single stage reducer, and FIG. 3 shows a multi-stage continuous reducer.

In FIG. 1, a batch reducer, the refractory metal oxide is reduced to pure free flowing elemental metal by contacting its oxide with the fluidizing and reducing gas, such as hydrogen. The reducing gas is introduced into a "Vycor" glass tube through an opening 2 in the bottom of the tube. The "Vycor" tube is open at the top. The fluidizing and reducing gas is heated by blowing it through a heated heat transfer medium 3. Before entering the fluidized bed area where the metal oxide or fluidized material 5 is located the fluidizing and reducing gas is evenly distributed by the gas distributor plate 4. A vibrator (not shown) continuously vibrates the system while it is in operation. The fluidizing and reducing chamber of the "Vycor" tube is enclosed in an electric furnace 6 which regulates the temperature of the system.

In FIG. 2, a single stage reducer, the fluidizing and reducing gas is introduced through a conduit 12 into the vertical reducing chamber 11. The reducing gas is evenly distributed in the chamber by a gas distributor plate 13. The pressure of the reducing gas keeps the metal oxide or fluidized material 15 in suspension and a vibrator 14 is in contact with the apparatus and continuously vibrates the system during the entire reducing cycle. The reduced metal is drawn off through a conduit 16 to a gas-tight container. Thereafter, additional refractory metal oxide is introduced into the apparatus through the feed opening 17, and the cycle is repeated. The spent reducing gas is passed through a filter or a conventional hot cyclone separator 18 and out of the reducing chamber by a conduit 19 to a gas waste or recovery area.

In FIG. 3, a multi-stage continuous reducer, the fluidizing and reducing gas is introduced into the vertical elongated reducing column 21 through the conduit 27 at the bottom of the column 21 with sufficient velocity to keep the metal oxide or fluidized material 25 in suspension. The reducing gas is evenly distributed by gas distributing plates 23, which physically separate the areas, before entering into each of the respective reducing areas. The velocity of the reducing gas and the action of the vibrators 24 maintain the metal oxide or fluidized material in a constant state of agitation. The partially reduced material is drawn off or conducted into the lower reducing area through the downcomer pipe 26 and finally out of the reducing chamber 21 through the opening 22 in the bottom of the chamber, to a gas-tight product container. New material or metal oxide is continuously fed into the reducing chamber 21 through the feed opening or tube 28. The spent reducing gas is removed from the reducing chamber 21 through the filter or hot cyclone separator 29 and the opening 30 to the gas waste or recovery area.

With the apparatus of FIG. 3, it is sometimes desirable to cool the fluent material or gas in the upper stages to a temperature between 400° C. and 650° C. by internal heat exchanger coils, external heat exchangers such as for preheating the reducing gas, or by introducing additional cool reducing gas. The continuous introduction of cool powdered raw material, however, may be sufficient to maintain the lower temperatures required in the initial reduction.

Gases such as hydrogen, forming gas, illuminating gas, methane, propane and similar gases can be used as the reducing gas. The preferred gas is hydrogen.

Materials that can be used as heat transfer media are steel shot, copper shot, steel wool, molybdenum wool, etc. At first copper shot was used in the experiments but it is preferred to use steel wool or molybdenum wool, or similar material, since copper shot has a tendency to stick together at high temperatures.

The temperatures for the most efficient reduction of molybdenum trioxide and ammonium paramolybdate to Mo (lower oxide) and Mo (metal powder) are of importance.

Molybdenum trioxide $MoO_3$ sublimes at temperatures in excess of 650° C.; therefore, the temperature must be controlled in relation to the two stages in the reduction to metal powder; powdered $MoO_3$ to powdered Mo (lower oxide) to Mo (metal powder). For example the first stage temperature should be held at 650° C. maximum and as close to this temperature as possible for the most efficient operation. Of course, the reduction to a lower oxide will proceed at a lower temperature, such as 400° C., but at a much lower rate. The reduction of the lower oxide to metal is carried out in excess of 650° C. and may be as high as 1400° C. but the selected temperature should be determined by its effect on equipment maintenance, physical state of the metal powder product, and power cost factors. 800° C. has been found to be a suitable temperature. The reduction rate is a direct function of the temperature. For best results it is essential that the compound being reduced be non-volatile at the temperature used.

Ammonium paramolybdate

Ammonium paramolybdate powder must be pre-dried to remove moisture before it can be reduced to prevent subsequent sticking. This can be done by (a) pre-drying in an oven at a temperature no higher than 110° C. or (b) by fluid bed drying at a temperature no higher than 220° C. In either case the pre-dried ammonium paramolybdate will then fluidize at higher temperatures of reduction and the actual reduction to lower oxides and to metal can then proceed as described for $MoO_3$.

Powdered ammonium paramolybdate, $MoO_3$, and $MoO_2$ made therefrom, because of their physical state, fluidize readily in a gas stream. The fluidization of these materials is improved by high frequency vibration of the reactor which also increases the free flowing properties of the elemental molybdenum. But, $MoO_3$ (purified by sublimation) will not fluidize readily unless high frequency vibration is applied.

EXAMPLE

The starting materials in each reducing process in the "Vycor" tube was either ammonium paramolybdate $(NH_4)_6Mo_7O_{24} \cdot 4H_2O$, pre-dried at 110° C., maximum temperature, to remove the water of crystallization, or $MoO_3$ made by ignition of ammonium paramolybdate crystals. A total of nine (9) batches of material, eight (8) of ammonium paramolybdate crystals and one (1) of $MoO_3$, were reduced in the "Vycor" tube reduction unit described herein. The following table gives the data pertaining to the reduction process.

The "Vycor" tube had an inside diameter of ⅝ inch and a length of 30 inches. "Vycor" was chosen for its transparency permitting observation of the fluidized suspension. In the $MoO_3$ test the reactor was vibrated by holding a small electric unit against the tube.

In the following table:

Column A gives the number of grams used in each batch.

Column B gives the time in minutes each batch was heated and the particular temperature or temperatures used.

Column C gives the total time each batch was heated.

Column D gives the amount of oxygen remaining in each batch after completion of the reaction. The results were obtained by the quantitative reduction of a sample of the product of each batch to pure metal powder with hydrogen. The values in Column D therefore represent the percentage oxygen (weight) remaining in the fluidized end product.

| Run No. | A | | B | | | C | D |
|---|---|---|---|---|---|---|---|
| | $MoO_3$, gms. | $(NH_4)_6Mo_7O_{24} \cdot 4H_2O$, gms. | 550° C. | 650° C. | 750° C. | Min. | percent oxygen (weight) remaining in end product |
| 1 | 75 | | | 9 | 25 | 34 | 27.69 |
| 2 | | 75 | | 40 | | 40 | 23.73 |
| 3 | | 75 | | 135 | | 135 | 14.39 |
| 4 | | 75 | | 150 | | 150 | 9.68 |
| 5 | | 75 | 180 | | | 180 | 6.39 |
| 6 | | 100 | 60 | 150 | | 210 | 23.58 |
| 7 | | 100 | 120 | 120 | | 240 | 17.49 |
| 8 | | 100 | 240 | | 120 | 360 | 0.41 |
| 9 | | 100 | 180 | | 120 | 300 | 0.61 |

The metal from runs 8 and 9 was in the form of rounded, generally spherical, free flowing, agglomerates having a particle size of approximately 1/10 mm. to 1 mm. The ultimate particles which make up the agglomerates have a diameter in the area of approximately 2 microns. The agglomerates are quite friable. Runs 1–7 show that a somewhat longer reaction or a higher temperature would be beneficial.

The product is well adapted for use in processes requiring a finely divided, free flowing powder. Thus, in powder metallurgy, the particles readily flow into all parts of the mold, and can be readily compacted, and sintered, if desired. Chemical reactions wherein finely divided molybdenum is used provide another area of utility.

I claim:
1. The process of producing free-flowing, finely divided molybdenum metal from a starting finely divided molybdenum compound of one of the group consisting of molybdenum oxide and ammonium paramolybdate, which process comprises:
   (a) placing said finely divided molybdenum compound into a reaction chamber;
   (b) forcing a reducing gas heated to a first predetermined temperature, sufficient to reduce said starting molybdenum compound to molybdenum dioxide, into said reaction chamber and upwardly through said finely divided molybdenum compound and simultaneously vibrating said reaction chamber to cause said finely divided molybdenum compound to assume a fluidized status of constant agitation;
   (c) continuing to force said heated reducing gas upwardly through said finely divided molybdenum compound as maintained in a fluidized status of constant agitation until said starting molybdenum compound has been reduced to finely divided molybdenum dioxide;
   (d) forcing a reducing gas heated to a second predetermined temperature, sufficient to reduce said molybdenum dioxide to molybdenum metal, into said reaction chamber and upwardly through said finely divided molybdenum dioxide and simultaneously vibrating said reaction chamber to cause said finely divided molybdenum dioxide to assume a fluidized status of constant agitation; and
   (e) continuing to force said reducing gas heated to said second predetermined temperature upwardly through said finely divided molybdenum dioxide as maintained in a fluidized status of constant agitation until said molybdenum dioxide has been reduced to free-flowing, finely divided molybdenum metal.

2. The process as specified in claim 1, wherein said first predetermined temperature to which said reducing gas is heated is from 400° C. to 650° C., and said second predetermined temperature to which said reducing gas is heated is between 650° C. and 1400° C.

3. The process as specified in claim 2, wherein said finely divided molybdenum compound and said molybdenum dioxide are simultaneously heated by applying external heat to said reaction chamber to promote reduction by said heated reducing gas.

4. The process as specified in claim 3, wherein said reducing gas is preheated by passing same through a heat-exchange medium.

5. The process as specified in claim 4, wherein said reaction chamber and said heat-exchange medium are both enclosed by a single furnace.

6. The process of continuously producing free-flowing, finely divided molybdenum from a starting finely divided molybdenum compound of one of the group consisting of molybdenum trioxide and ammonium paramolybdate, which process comprises:
   (a) continuously introducing said finely divided molybdenum compound into one section of a first stage of a reducing chamber;
   (b) forcing a reducing gas heated to a first predetermined temperature, sufficient to reduce said starting molybdenum compound to molybdenum dioxide, upwardly through said finely divided molybdenum compound and simultaneously vibrating said first stage to cause said finely divided molybdenum compound therein to assume a fluidized status of constant agitation;
   (c) continuing to introduce said finely divided molybdenum compound into said one section of said first stage to move previously introduced finely divided molybdenum compound therein toward an other section of said first stage, and continuing to force said reducing gas heated to said first predetermined temperature through said fluidized and moving finely divided molybdenum compound in said first stage to cause same to convert to finely divided molybdenum dioxide by the time it has been moved to said other section of said first stage;
   (d) moving the formed molybdenum dioxide from said other section of said first stage into one section of a second stage of said reducing chamber which is physically separated from said first stage;
   (e) forcing a reducing gas heated to a second predetermined temperature, sufficient to reduce said molybdenum dioxide to molybdenum metal, upwardly through said finely divided molybdenum dioxide in said second stage and simultaneously vibrating said second stage to cause said finely divided molybdenum dioxide therein to assume a fluidized status of constant agitation;
   (f) continuing to move finely divided molybdenum dioxide into said one section of said second stage to move previously introduced finely divided molybdenum dioxide in said second stage toward an other section of said second stage, and continuing to force said reducing gas heated to said second predetermined temperature through said fluidized and moving finely divided molybdenum dioxide in said second stage to convert same to free-flowing, finely divided molybdenum metal by the time it has been moved to said other section of said second stage; and
   (g) moving said formed free-flowing, finely divided molybdenum metal from said other section of said second stage to an air-tight container.

7. The process of continuously producing free-flowing, finely divided molybdenum from a starting finely divided molybdenum compound of one of the group consisting of molybdenum trioxide and ammonium paramolybdate, which process comprises:
   (a) continuously introducing said finely divided molybdenum compound into one section of an upper stage of a vertical reducing chamber;
   (b) forcing a reducing gas heated to a temperature of from 400° C. to 650° C. upwardly through said finely divided molybdenum compound and simultaneously mechanically vibrating said upper stage to cause said finely divided molybdenum compound therein to assume a fluidized status of constant agitation;
   (c) continuing to introduce said finely divided molybdenum compound into said one section of said upper stage to move previously introduced finely divided molybdenum compound therein toward an other section of said first stage, and continuing to force said heated reducing gas through said fluidized and moving finely divided molybdenum compound in said upper stage to cause same to convert to finely divided molybdenum dioxide by the time it has been moved to said other section of said upper stage;
   (d) moving the formed molybdenum dioxide from said other section of said upper stage into one section of a lower stage in said vertical reducing chamber which is physically separated from said upper stage;
   (e) forcing a reducing gas heated to a higher temperature of between 650° C. and 1400° C. upwardly through said finely divided molybdenum dioxide in said lower stage and simultaneously mechanically vibrating said lower stage to cause said finely divided molybdenum dioxide therein to assume a fluidized status of constant agitation;
   (f) continuing to move finely divided molybdenum dioxide into said one section of said lower stage to move previously introduced finely divided molybdenum dioxide in said lower stage toward an other section of said lower stage, and continuing to force said higher-temperature-heated reducing gas through said fluidized and moving finely divided molybdenum dioxide in said lower stage to convert same to finely divided and free-flowing molybdenum metal by the time it has been moved to said other section of said lower stage; and (g) moving said formed free-flowing, finely divided molybdenum metal from said other section of said lower stage to an air-tight container.

8. The process as specified in claim 7, wherein the temperature of said reducing gas forced into said upper stage is at least about 550° C., and the temperature of said reducing gas forced into said lower stage is about 750° C. to 800° C.

References Cited by the Examiner

UNITED STATES PATENTS 2,628,077  2/1953  Handwerk _____ 75—26

FOREIGN PATENTS 469,230  11/1950  Canada.

OTHER REFERENCES

Chemical Engineering, 1-47, "Fluidization in Chemical Reactions," J. C. Kalbach.

Metallurgy of the Rarer Metals, "Molybdenum," vol. 5, 1956, L. Northcott, pp. 19–20.

LEON D. ROSDOL, *Primary Examiner.*

CARL D. QUARFORTH, *Examiner.*

M. J. SCOLNICK, *Assistant Examiner.*